Figure 1:
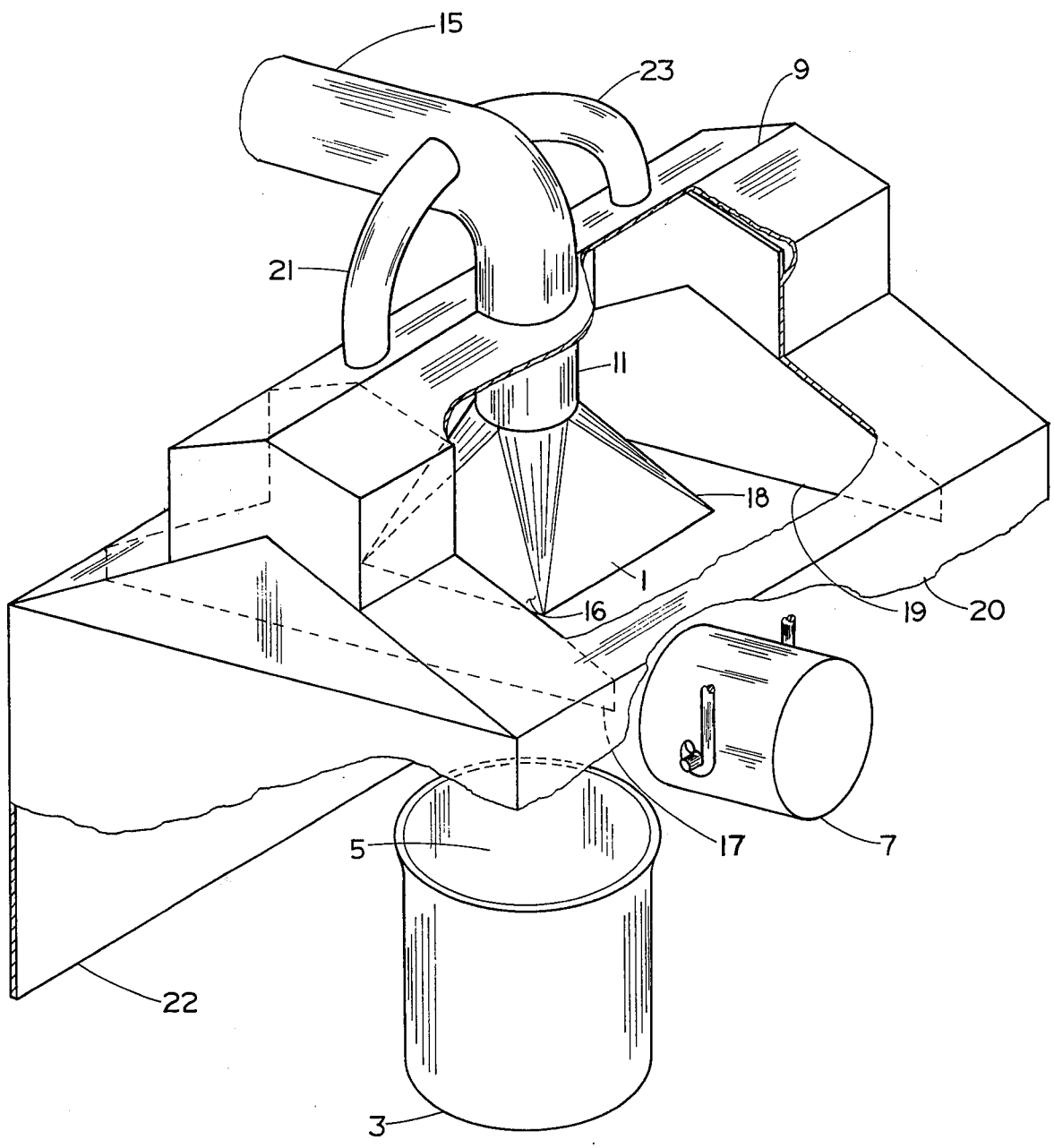

United States Patent [19]

Applewhite

[11] 4,031,819
[45] June 28, 1977

[54] APPARATUS FOR COLLECTING AND CONVEYING OF FUMES FROM A FURNACE

[75] Inventor: Grant D. Applewhite, Louisville, Ky.

[73] Assignee: American Air Filter Company, Inc., Louisville, Ky.

[22] Filed: Jan. 7, 1976

[21] Appl. No.: 647,059

[52] U.S. Cl. .............................. 98/115 R; 266/158; 266/159; 432/72
[51] Int. Cl.² ......................................... F23J 11/00
[58] Field of Search ............... 98/115 R, 115 K; 266/158, 159; 13/1; 432/72; 110/119; 126/299 R; 104/52; 202/254, 263

[56] References Cited

UNITED STATES PATENTS

| | | |
|---|---|---|
| 3,071,059 | 1/1963 | Schleifer .......................... 98/115 R |
| 3,154,406 | 10/1964 | Allard ............................. 266/158 X |
| 3,863,906 | 2/1975 | Vicard ............................. 266/158 |

Primary Examiner—Ronald C. Capossela

[57] ABSTRACT

In a device for the collecting and conveying of fumes emanating from a furnace having an opening therein, the device includes a fume hood disposed in communication with the furnace opening with a fume collecting reservoir extending around the fume hood, the fume collecting reservoir and the fume hood being in further fluid communication with an exhaust system, the exhaust system including means therein to selectively control the flow of fumes from the fume collecting reservoir and the fume hood.

6 Claims, 2 Drawing Figures

APPARATUS FOR COLLECTING AND CONVEYING OF FUMES FROM A FURNACE

BACKGROUND OF THE INVENTION

The present invention relates to a fume collecting device and method of removing fumes and particularly relates to an apparatus and method for the collecting and conveying of fumes from a furnace having an opening therein.

In the removal of smoke, fumes, and dust from furnaces and the like it is well known to provide a fume hood in alignment with an opening in the furnace to remove the fumes, dust, and smoke emanating therefrom. However, in the operation of the furnace several different operating steps are involved in each operating cycle, at each step the evolution of fumes and the like varying in concentration. In order to remove all the fumes which emanate during the various steps in the cycle and particularly when the maximum concentration of fumes are released, enormous fume hoods are necessary as well as the related exhaust equipment associated therewith. The cost of the installations of these fume hoods including the exhaust equipment is relatively expensive.

SUMMARY OF THE INVENTION

In the present invention, it is recognized that it is desirable to provide a fume collecting device for furnaces having an opening therein and the like which is relatively economical in cost and yet enables thorough fume removal during the entire operating cycle of a furnace.

The present invention advantageously provides a straightforward arrangement for an apparatus for the collecting and conveying of fumes from a furnace having an opening therein wherein the fume hood which is utilized is smaller than those presently in use and the exhaust system for the fumes does not require relatively high cost blower means. This is accomplished by spacing the fume hood from and in alignment with the opening of a furnace and providing a fume collecting reservoir around the fume hood to collect the overflow of fumes during periods of high concentration of fumes emanating from the furnace wherein the exhaust system removes the fumes captured by the fume hood for a preselected period of time, then when the fumes at the fume hood subsides, removes the fumes caught in the reservoir.

Various other features of the present invention will become obvious to those skilled in the art upon reading the disclosure set forth hereinafter.

More particularly, the present invention resides in the combination with a furnace having an opening therein, an apparatus for the collecting and conveying of fumes from the furnace comprising: a fume hood spaced from and disposed in communication with the opening in a furnace; a housing spaced from the fume hood and substantially enclosing the fume hood, the spacing between the housing and the fume hood defining a fume collecting reservoir; and, an exhaust means in flow communication with the fume hood and the fume collecting reservoir with flow control means therein to selectively control the flow of fumes from the fume hood and the fume collecting reservoir.

Even more particularly, the present invention resides in a method for collecting and conveying of fumes from a furnace comprising the steps of: collecting fumes emanating from a furnace in two collecting reservoirs and simultaneously therewith removing fumes from one of the reservoirs; storing fumes in the other of the reservoirs for a preselected period of time; and, removing the fumes from the other of the reservoirs.

It is to be understood that the description of the examples of the present invention given hereinafter are not by way of limitation and various modifications within the scope of the present invention will occur to those skilled in the art upon reading the disclosure set forth hereinafter.

Figure 2:
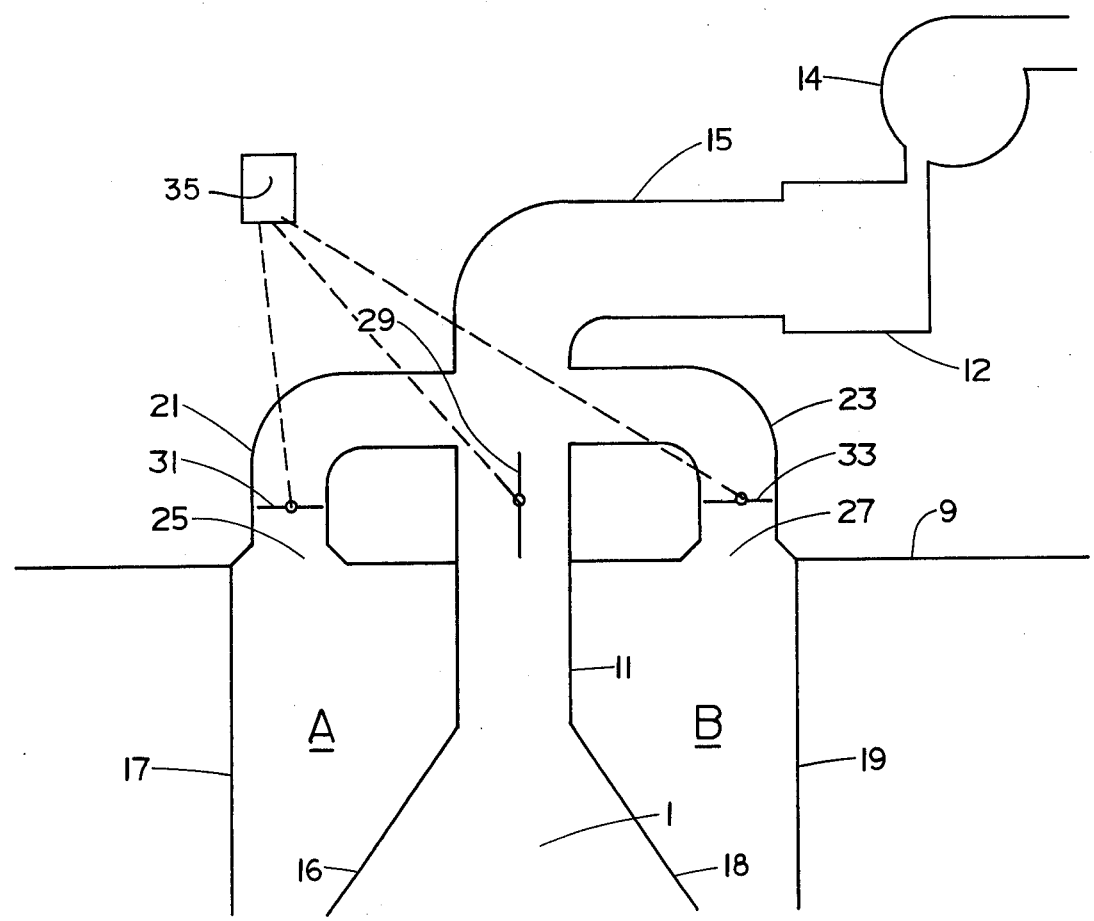
Figure 2:
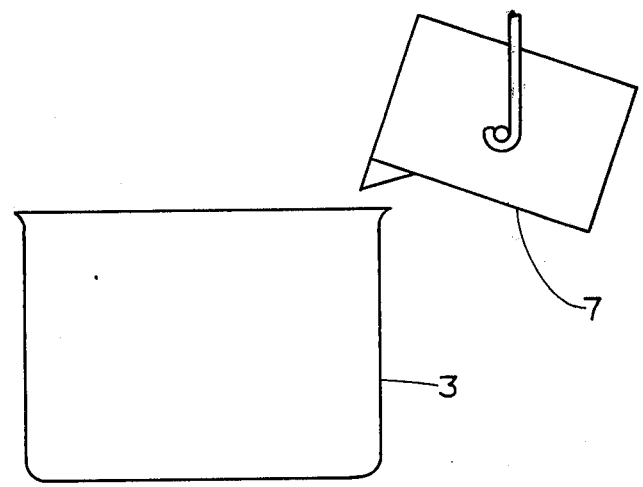

Referring to the drawing:

FIG. 1 is a perspective view, with selected portions cut-away, of a fume collecting and conveying apparatus of the present invention; and, FIG. 2 is a schematic diagram of the apparatus of FIG. 1.

In the Figures, a flared canopy fume hood 1 is disposed advantageously above and in spaced alignment with a furnace 3. The furnace 3 is usually constructed of firebrick, which is well known in the art, with an opening 5 in the top thereof, the opening 5 being disposed to receive scrap and other materials from a charge bucket 7, and the like.

The flared canopy hood 1 extends beneath the roof 9 of a building including the furnace 3 therein and is in fluid communication with an exhaust duct 11, exhaust duct 11 extending through the roof 9 and being connected to a conduit 15 which is in flow communication with a dust collector system, shown schematically in FIG. 2 by the numeral 12. The dust collector system 12 may be any well known type in the art, such as electrostatic precipitators, wet scrubbers, fabric filters and the like, as well as combinations thereof. A blower 14 is shown disposed on the clean air side of the dust collector 12 as the means for moving fumes through the dust collector system. However, it is realized that other fume moving means may be utilized as well as other positions for the blower 14 without departing from the spirit and scope of the present invention.

Spaced from and substantially enclosing the fume hood 1 is a housing having four walls 17, 19, 20 and 22, respectively. On opposed sides of the flared canopy hood 1 are the walls 17 and 19, respectively, which are attached to and supported from the roof 9, the lower edges of the walls 17 and 19 extending vertically downwardly to a point at least in horizontal alignment with the lower edges of sides 16 and 18, respectively, of the hood 1. The walls 17 and 19 are substantially flat plate members disposed in a vertical position and extend along the opposed sides of the fume hood 1 a distance at least equal to or beyond the terminating ends of the sides of the hood 1. The walls 17 and 19 connect with walls 20 and 22 which are also flat plate members disposed in a vertical position to define, in combination with fume hood 1, a fume collecting reservoir or plenum designated by the letters A and B in FIG. 2. The reservoir designated by the letters A and B is in fluid communication with exhaust ducts 21 and 23, respectively, exhaust ducts 21 and 23 extending through openings 25 and 27 in the roof 9 and connecting with the conduit 15.

Disposed within the exhaust ducts 11, 21 and 23, which are in fluid communication with the fume hood 1 and the reservoir A–B are damper assemblies 29, 31 and 33, respectively. The damper assemblies are aligned so that when the damper assembly 29 is open, as shown in FIG. 2, damper assemblies 31 and 33 are in a closed position. And, when damper assembly 29 is in a closed position, damper assemblies 31 and 33 are in an open position. Control for the damper assemblies 29, 31, and 33 is by any means known in the art, such means for control being designated by the numeral 35.

Generally, when the maximum amount of fumes are emanating from the furnace 3 the damper assembly 29 is in an open position and the damper assemblies 31 and 33 are in a closed position. During this period of heavy pollutant concentration, most of the fumes coming from the furnace 3 are caught in the flared canopy hood 1 and removed through the exhaust conduit 15 while the overflow of fumes, which are relatively hot, flow upwards into the reservoir A–B and remain in this area for a sufficient length of time to allow for the high fume concentration to decrease or settle down. As soon as the fumes settle down, the damper assembly 29 is closed and the damper assemblies 31 and 33 are open to the exhaust conduit 15 wherein the fumes which are caught in the reservoir A–B are exhausted therefrom.

In the operation of the collecting and conveying apparatus of the present invention, by removing the fumes which emanate from the furnace 3 in the afore-described two step operation, it is possible to utilize smaller canopy hoods as well as a smaller exhaust system than would be required when the fumes are being removed in the one step prior art operations.

It will be realized that various changes may be made to the specific embodiment shown and described without departing from the scope and spirit of the present invention.

What is claimed is:

1. In combination with a furnace having an opening therein, an apparatus for the collecting and conveying of fumes from said furnace comprising: a fume hood spaced from and disposed in communication with the opening in a furnace; a housing spaced from said fume hood, the spacing between said housing and said fume hood defining a fume collecting reservoir; and, exhaust means in flow communication with said fume hood and said fume collecting reservoir with flow control means therein to selectively control the flow of fumes from said fume hood and said fume collecting reservoir, said flow control means including first damper means controlling flow through said fume collecting reservoir; and second damper means controlling flow through said fume hood and, means for moving said first damper means to one position while moving said second damper means to an opposed position whereby said positions determined whether said fume hood is in flow communication with said exhaust means or said fume collecting reservoir is in flow communication with said exhaust means.

2. The apparatus of claim 1, said fume hood being disposed above said opening.

3. The apparatus of claim 1, said housing substantially surrounding said fume hood.

4. The apparatus of claim 1 wherein the lower edges of said housing extend vertically downwardly below the lower edges of said fume hood.

5. The apparatus of claim 1 wherein said exhaust means includes a plurality of ducts in parallel, at least one of said ducts being in fluid communication with said fume hood and at least another of said ducts being in fluid communication with said fume collecting reservoir.

6. The apparatus of claim 5 wherein at least another of said ducts in fluid communication with said fume collecting reservoir includes two ducts, each of said ducts being disposed on opposed sides of said reservoir.

* * * * *